ELECTRON OPTICS FOR INFRARED CAMERA TUBES

Filed Sept. 19, 1960 2 Sheets-Sheet 1

Inventors:
Rowland W. Redington;
Pieter J. Van Heerden,
by Richard R. Brainard
Their Attorney.

ELECTRON OPTICS FOR INFRARED CAMERA TUBES

Filed Sept. 19, 1960

2 Sheets-Sheet 2

Inventors:
Rowland W. Redington;
Pieter J. Van Heerden,
by Richard R. Brainard
Their Attorney.

3,185,891

ELECTRON OPTICS FOR INFRARED CAMERA TUBES

Rowland W. Redington and Pieter J. van Heerden, Schenectady, N.Y., assignors to General Electric Company, a corporation of New York Filed Sept. 19, 1960, Ser. No. 56,798
14 Claims. (Cl. 313—65)

This invention relates to photoconductive camera tubes sensitive in the infrared region, and particularly to means for improving the contrast and sensitivity of such tubes.

Certain materials exhibit photoconductive properties in response to infrared radiation, and therefore may be suitably employed to construct television-type infrared camera tubes. In a vidicon-type tube, for example, illumination may be received on one side of an infrared sensitive semiconductor target through a relatively positive transparent electrode contacting the semiconductor surface. The reception of illumination creates free charge carriers in the semiconductor at the point illuminated. Either an electron or hole may constitute a carrier which may pass through or part way through the target to establish a photocurrent. The photocurrent reduces the voltage drop across the photoconductive layer in the illuminated area to make the opposite target surface, exposed to a scanning electron beam, more positive. At the instant when the illuminated picture element is scanned, just enough electrons are deposited by the scanning beam to replace the negative charge removed in the preceding frame period by photoconduction. The instantaneous charge build-up, capacitively coupled to the transparent electrode, constitutes the picture signal output as in the ordinary vidicon.

Infrared detectors of the camera tube type, for example, those employing extrinsic semiconductor targets are superior to the infrared detection schemes heretofore proposed. Prior systems of the point detector type utilize radiation from different points in the detected scene which are consecutively directed on to a single detector. In such a system radiation from each point of the observed scene is used only during optical passage over the detector cell. If 10,000 picture elements are to be imaged in this manner only one ten-thousandth of the radiation from the observed scene would be used. Alternatively, a number of point detectors may be employed in a linear array but the arrangement becomes mechanically and electrically complicated and the resultant picture signal lacks fidelity, while sensitivity is decreased since each point detector still consecutively covers a number of elements in the scene under observation. A television-type picture tube, on the other hand, is well suited to radiation imaging since an image is continuously received and stored at the target while the target representation is scanned at conventional television scanning rates.

The targets employed in infrared camera tubes, for example, the semiconductor type photoconductive target, are frequently refrigerated to low temperatures to increase the dark current resistivity of the target and increase its sensitivity. While the target may be laterally surrounded in a refrigerating medium it must of necessity be substantially open on two sides thereof, first, in the direction of the received infrared radiation and second, in the direction of the tube's electron beam. Of course, it is desirable that the target be receptive to the first source of radiation representing the detected scene; however, the second direction is also the direction of the electron gun's heated cathode and therefore represents an infrared source which may obscure the desired information on the target.

Furthermore, the drift space wall which conventionally surrounds the path of the electron beam from the electron gun to the target is ordinarily formed as a cylindrical metal electrode and is itself further surrounded with focusing coils and deflection coils. The magnetic fields created by these coils tend to set up eddy currents in the drift space wall which act as a further infrared source due to joule heating therein.

It is, therefore, an object of this invention to provide an improved infrared camera tube of maximum sensitivity wherein the desired detected image is not masked by extraneous heat sources.

It is another object of the present invention to provide an improved infrared camera tube with a target which may be appropriately refrigerated without undue interference from unwanted heat sources and which exhibits improved sensitivity and contrast.

It is a further object of this invention to provide an improved infrared camera tube wherein the target is effectively shielded from heat except in the direction of the radiation to be detected.

In accordance with the present invention, local generation of eddy current heat by the magnetic coils surrounding the drift space wall in an infrared camera tube is substantially prevented by longitudinally slotting the drift space wall at least near the forward or target end of the tube. In addition, a second or surrounding slotted wall has slots offset from the slots in the first wall whereby the drift space, or space inside the walls near the target, is shielded from outside radiation which might otherwise pass through the slots in the first wall.

According to an additional feature of the invention, the slot edges are bent in each case towards the opposite wall providing an interlocked arrangement and therefore a circuitous path to any outside radiation. Facing portions of the walls are preferably blackened to absorb radiation.

According to another feature of the invention, a plurality of apertured masks are disposed between the tube's electron gun and the drift space near the target, the apertures being offset to provide no straight line path between the tube's heat radiating electron gun and the target. Maze coils are arranged to conduct the electron beam through the apertures to the target, but the target is therefore effectively shielded from the heat given off by the electron gun's cathode. All inside surfaces are again preferably blackened.

The subject matter which we regard as our invention is particularly pointed out and distinctly claimed in the concluding portion of this specification. The invention, however, both as to organization and method of operation, together with further objects and advantages thereof, may best be understood by reference to the following description taken in connection with the accompanying drawings wherein like reference characters refer to like elements and in which:

Figures 1, 2, 3, 4:
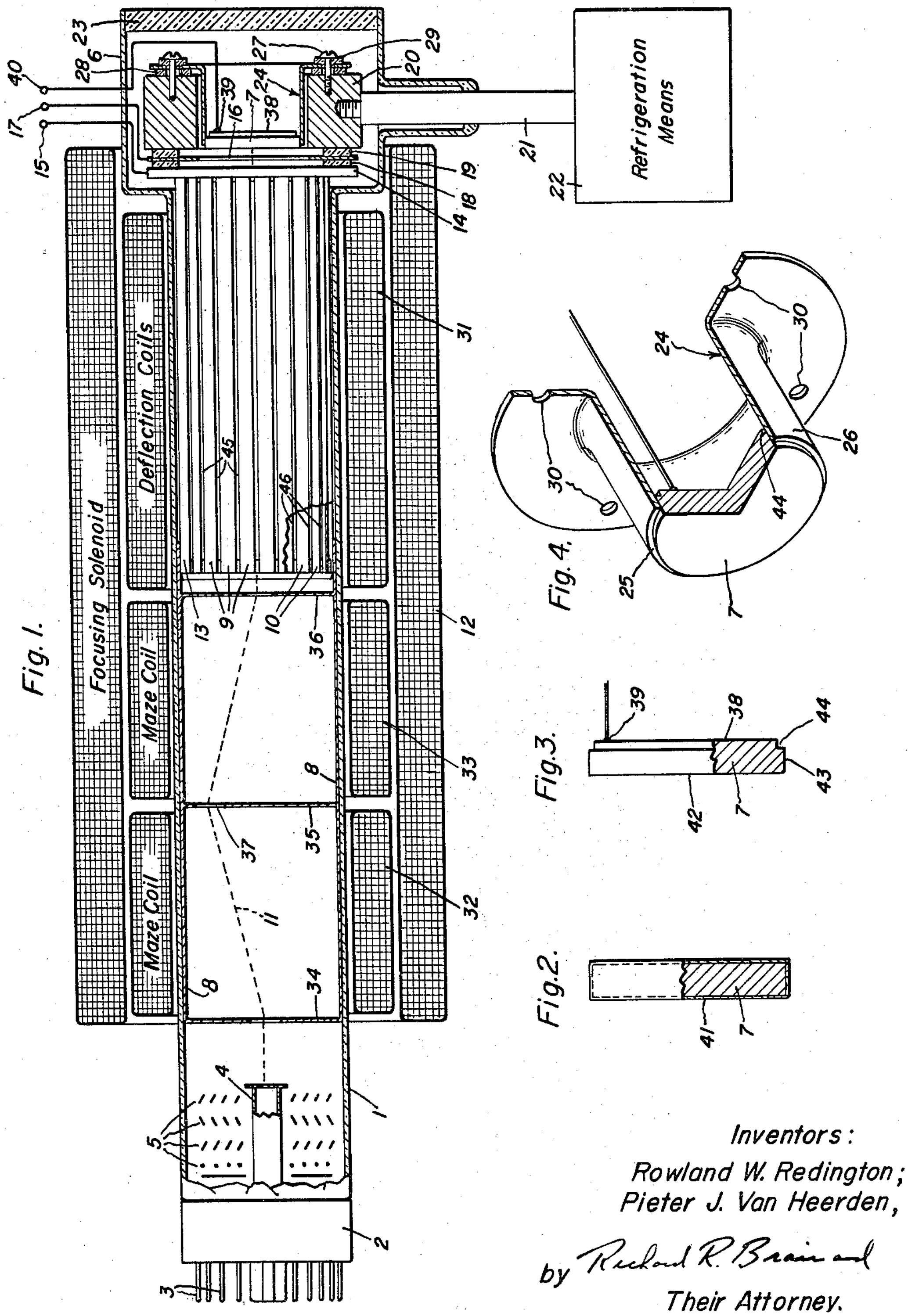
FIG. 1 is an elevational view, partially in cross-section, of an infrared camera tube and target constructed in accordance with the present invention.
FIG. 2 is an enlarged elevational view partially in cross-section, of the semi-conductor target coated with metal, specifically copper.
FIG. 3 is an enlarged elevational view partially broken away of the target with the metal coating removed and with portions of the semiconductor material removed.
FIG. 4 is an isometric drawing of the semiconductor target placed in its retaining member.

Referring to FIG. 1, showing by way of example an infrared sensitive camera tube embodying features of the present invention, a long cylindrical glass envelope 1 is closed at one end by means of a tube base 2 providing connections 3 for electron gun structure 4 and electron multiplier output device 5. The electron gun is a source of relatively low velocity electrons directed toward the opposite end of the glass envelope, the latter being enlarged in diameter at 6 to accommodate structure for a target 7. The glass envelope 1 houses conducting cylindrical drift space defining walls 8, 9 and 10, maintained at a potential to aid in focusing an electron beam 11 which is produced by the electron gun 4 and focused generally along the axis of said drift space defining walls 8, 9 and 10 by a focusing solenoid 12. Cylindrical drift space wall 8, conveniently formed of copper or copper-plated stainless steel and extending approximately one-half of the length of the focusing solenoid from the electron gun, is joined at the middle of the tube to a double walled drift space section comprising walls 9 and 10. Walls 9 and 10, which accomplish a heat limiting function, extend for approximately the remainder of the focusing solenoid length to enlarged envelope portion 6. Termed a "bird cage," this latter section is employed primarily in connection with infrared pickup.

The bird cage section is shown in greater detail in FIGS. 5, 6 and 7 and is later described in greater detail in connection therewith. Included in the bird cage are an outer cylindrical wall 9 and an inner cylindrical wall 10, both of which are longitudinally slotted in the direction of the tube axis to suppress heat generating eddy currents induced by the magnetic circuits surrounding the tube. The slots 46 in inner wall 10 are displaced from juxtaposition with the slots 45 in wall 9 and the edges defining the slots in each wall are bent towards an interslot portion of the other cylindrical wall to form tabs or flanges, thereby providing more a circuitous and therefore effectively shielded path between outside radiation and the drift space. Moreover, the outside of the inside wall and the inside of the outside wall are blackened, for example, with copper oxide material for further absorbing any possible radiation passing therethrough. A copper oxide material known as "Ebonal-C" may be employed for this purpose.

Outer wall 9, and specifically the inwardly extending flanges thereof, are matingly received by wall 8, the latter being arranged to overlap wall 9 for a short distance to insure outside radiation masking at their junction. All sections of walls 9 and 10, however, are electrically insulated from wall 8 at the junction, except for a single electric connecting section 13 of wall 9, conveniently located at the top of the tube. The electrical connection can be formed by soldering walls 8 and 9 together at this point.

The various sections forming walls 9 and 10 are all insulated from each other except at the target end of the tube where they are joined electrically and mechanically to a copper flange 14 to which further electric connection is made by means of terminal 15 in FIG. 1, maintained at the tube's drift space potential. Annular decelerating ring 16, connected to the appropriate decelerating voltage by means of terminal 17, is joined to flange 14 with sapphire spacing members 18, while additional sapphire members 19 joined to the remaining side of ring electrode 16 are further secured to annular member 20, conveniently formed of copper.

Annular member 20 acts to support the target 7 and to conduct heat away from the forward or target end of the tube including especially target 7. In the infrared radiation region it is frequently desirable to operate the tube target at temperatures near the temperature of liquid nitrogen or below in order to increase the target's dark current resistivity and therefore sensitivity. To this end, cold finger 21, which may also be formed of copper, is joined to annular member 20 and passes through a seal in the glass envelope to refrigeration means 22. The refrigeration means 22 may be any convenient apparatus for securing to tube target 7, and appropriate operating temperature, e.g. the temperature of nitrogen at its boiling point. Refrigeration means 22 may consist of a double Dewar flask containing liquid nitrogen or some other low temperature liquid which may be readily replenished during operation by means not shown. Alternatively, any convenient refrigeration device reaching these temperatures may be utilized, and if desired, a refrigerant can be pumped inside cold finger 21 and around inside member 20.

The tube is directed so that detected radiation falls upon the front of target 7 through window 23, conveniently formed of sapphire for targets which are not sensitive at wavelengths longer than 6 microns, and an optical system (not shown) in front of the tube. The radiation then passes through substantially transparent electrode 38 on the front surface of target 7.

Target 7, formed of an extrinsic semiconductor material, is positioned within annular member 20 by means of a flanged retaining member 24, shown in greater detail in FIG. 4. The semiconductor target 7 may take the form of relatively thin and desirably monocrystalline wafer of appropriately doped germanium or silicon, soldered around its edge 25 to retaining member 24 with indium solder. Retaining member 24 has a cylindrical section 26 with a smaller outside diameter than the inside diameter of member 20 and is secured to member 20 by a radial flange at the end of the cylinder remote from target 7. The radial flange extends over the forward side of annular member 20 so that it may be joined thereto with machine screws 27. These machine screws are tapped into annular member 20 but are electrically insulated from retaining member 24 by sapphire spacers 28 positioned between annular member 20 and retaining member 24, as well as by insulating washers 24, which may be formed of the material known as Teflon, disposed between the screw heads and member 24. Holes 30 in the retaining member flange, which receive the screws 27, are large enough in diameter so that no electrical connection is made between the flange and the screws.

Conventional deflection coils 31 surround drift space walls 9 and 10, on the inside of focusing solenoid 12 while maze coils 32 and 33 are arranged in that order from the electron gun end of the tube to the deflection of coils and also inside focusing solenoid 12. Apertured masks or partitions 34, 35 and 36 are joined to the inside surface of the drift space defining walls 8 at selected intervals therealong, these apertures providing a path for electron beam 11. These maze coils and masks, like the aforementioned bird cage are employed primarily when the tube is operated in the infrared detection region.

A first mask 34, at the electron gun end of the tube has an aperture desirably centrally located to receive easily the undeflected electron beam, while partition 36, near the middle of the tube also has an aperture conveniently centrally located so that the electron beam will exit near the center of the envelope where it is influenced in orthogonal directions by deflection coils 31. However, an intermediate apertured partition 35 has its aperture 37 radially displaced with respect to the central axis of the tube. Maze coil 32 is arranged to laterally deflect the relatively slow electron beam through aperture 37. Maze coil 33 is then reversed in electrical polarity to deflect the electron beam back to its central location for passage through the aperture in partition 36. The inside surface of drift space wall 8 is conveniently blackened with copper oxide material as are both sides of the partitions. In the above manner direct heat radiation caused by a heated cathode in electron gun 4, being substantially straight line, is prevented from reaching the forward or target end of the tube 6. The maze consisting of partitions 34, 35 and 36 blocks the heat radiation although the electron beam is conducted through the maze with maze coils 32 and 33. The heat shielding of the target and the forward end of the tube contributed by the maze and slotted walls 9 and 10 considerably reduces its ambient heat and therefore increases the quality of the picture produced by the target. It is desirable to locate the aperture centrally in outside partitions 34 and 36 while offsetting aperture 37 in partition 35, the electron beam being therefore most easily received from the electron gun and transmitted on to the deflection region for substantially perpendicular presentation to the target. Maze coils 32 and 33 are similar to one another and are connected to relatively constant but equal and opposite sources of voltage (not shown) to provide the constant deflection pattern through the maze of partitions. The return electron beam, passing from target 7 back to electron multiplier 5, will be similarly conducted through the maze in a reverse direction by the maze coils.

The front of target 7, or the side oriented toward window 23, is provided in a manner to be described with a relatively conducting although substantially transparent, "coating" or electrode 38, this "coating" being analogous to the transparent electrode in the vidicon-type tube. A soldered connection 39 may be made conveniently to this coating and is coupled to terminal 40, maintained by means not shown at a voltage between approximately zero and 60 volts positive. The voltages at terminals 15, 17 and 40 are arranged, inter alia, in combined effect for causing electron beam 11 to normally return to electron multiplier 5 in the absence of photoconduction through target 7 of the specific embodiment.

The tube together with its focusing solenoid may have a construction similar to but having an overall length approximately twice that of a conventional image orthicon tube, the target being placed at an electron beam focal point twice the usual distance from the electron gun. The deflection coils in the tube may then be the same as in such conventional image orthicon, but with added maze coils of similar construction occupying an approximately equal length between such deflection coils and the electron gun.

In general operation, the camera tube of FIG. 1 functions to receive radiation on target 7 through sapphire window 23 after passing through an optical system (now shown), this radiation pattern appearing as the variations in the scanned output signal of electron multiplier 5. Electron gun 4 produces a relatively slow stream of electrons deflected into a somewhat spiral pattern and focused at the target 7 back surface by focusing solenoid 12 cooperating with drift space defining walls 8, 9 and 10, the latter being maintained at substantially the same voltage as the electron beam. Maze coils 32 and 33 deflect the electron beam through the apertures in partitions 34, 35 and 36 and thence to the area of the drift space circumscribed by drift space walls 9 and 10 wherein the electron beam is deflected into an appropriate television-type raster by deflection coils 31. The deflection field of these coils is arranged such that the electron beam scans the "back" side of target 7 depositing or attempting to deposit electrons thereon, while the transparent electrode 38 is maintained at positive voltage relative to the electron beam, being on the order of a plus 50 volts.

A quantum of radiant energy, for example infrared energy, passing through transparent electrode 38 into a p-type target 7 excites a free hole which becomes a current carrier at the point where the radiation strikes. The hole theoretically passes directly through the target 7 to the electron beam side neutralizing an electron charge where it passes through. When the picture element is scanned, just enough electrons are deposited by the scanning beam to replace the negative charge removed in the preceding frame by the said hole neutralizing an electron, that is by the photoconduction.

If no substantial amount of charge is replaced by the scanning beam at the instant it is directed to the point under consideration, it will substantially fully return by essentially the same path through the tube to the electron multiplier 5. The signal output is then a function of reduction in returned beam electrons caused by illuminated target elements.

This electron multiplier output arrangement is desirably included for increasing the sensitivity of the tube although it will be apparent to those skilled in the art that the output signal could be coupled alternatively from the transparent electrode 38, utilizing an appropriate power supply dropping impedance.

The target 7 employed in the FIG. 1 embodiment may be conveniently approximately one inch in diameter and from 10 to 40 mils in thickness. The 40 mil thickness will, e.g., result in an infrared resolution of approximately 100 lines per centimeter while the 10 mil thickness will result in resolution giving approximately 400 lines per centimeter.

The target 7 is formed of extrinsic semiconductor material, that is semiconductor material which contains certain specified impurities in order to render it suitably conductive or photoconductive. In accordance with a specific embodiment of the present invention, p-type semiconductor material is employed as an infrared detecting target wherein such target is initially formed from semiconductor material which is at first n-type. For example, n-type germanium containing arsenic or antimony impurities, then has added to it a quantity of copper metal which approximately balances the said arsenic or antimony in atomic percentage. The resulting compensated material is found to be effectively of the p-type having a usable copper impurity "acceptor level," approximately .34 electron volt in energy greater than the normal germanium "valence energy band." Then when a quantum of radiation energy strikes the semiconductor, an electron may be excited thereby from the germanium "valance band," to the .34 electron volt copper level, this energy change corresponding to radiant energy excitation of about 4 microns in wave length, that is, radiant energy in the usable infrared spectrum. A conducting hole is then left in the "valence band" to produce a useful photoconducting function. It follows that a semiconductor target with this impurity will be sensitive to, and receive energies in, the infrared radiation region.

Copper as a p-type impurity, in addition to providing an energy level appropriate to infrared detection, provides sufficient electron mobility and sufficient dark current resistivity, particularly at low temperatures, to function well in a photoconductive target. The dark current resistivity of the copper doped or copper impurity containing germanium employed increases from about one ohm-centimeter at room temperature to greater than $10^{12}$ ohm centimeters at the boilng temperature of liquid nitrogen.

The extrinsic type, that is the doped or impurity containing type, semiconductor has further advantages as a target material; targets of such material may be made thicker than would an intrinsic or non-doped semiconductor material. The thickness of any photo-conductive camera tube target is normally limited either by the requirement that the radiation be approximately homogeneously absorbed or that the thickness be less than the range of the photogenerated charge carriers. The limits are very short for many materials and thus the thickness is often limited in the case of conventional intrinsic semiconductors to thicknesses on the order of one radiation length. However, with an extrinsic semiconductor, quanta of radiation absorbed as they pass through the target may be regulated by the effective amount of impurity added in the material. Therefore an extrinsic photoconductor target may be thicker than an intrinsic photoconductor. The added thickness decreases the target's capacitance from one surface to the other making its response quicker, and increases the allowable overall size and effective sensitivity of the target by as much as 10 times over what an intrinsic target sensitivity would be for the same allowable amount of capacitance lag or "stickiness."

The semiconductor target 7 may be constructed by copper plating a slightly oversized target wafer blank of commercially available n-type germanium, containing an arsenic or antimony impurity. The blank is illustrated in FIG. 2 including a copper coating 41. The plated blank is then heated or roasted for approximately a day or two allowing the metal to diffuse into the semiconductor blank. The temperature at which this heating is carried out is determined by the initial amount of n-type impurities, i.e., the arseinc or antimony, initially included in the semiconductor blank, as conveniently determined for example by Hall effect measurements. It is desired to add enough copper impurity by the heat diffusion process to balance off the n-type impurity with approximately 95% or so as much acceptor metal by atomic percentage. The amount of metal added by the heating process is understood to be a function of the temperature at which the process is carried out and is therefore determined from solid solubility curves of a metal in a semiconductor, e.g., copper in germanium. For such a chart reference may be had to page 86, vol. 105, Physical Review, January 1, 1957, "Triple Acceptors in Germanium" by H. H. Woodbury and W. W. Tyler. While the copper diffuses into the semiconductor, the n-type impurity diffuses out somewhat at the surface. Since arsenic and antimony have appreciably smaller diffusion constants than copper, only a thin layer near the surface is depleted of the n-type impurity.

After the coated semiconductor blank is heated for a day or two, the copper plating is peeled off or removed by hydrofluoric acid and the back side of the wafer or side which is to be oriented towards the electron beam is surface-etched or undercut in some other manner to remove a layer where the n-type impurity has diffused out somewhat. Such undercut area is numbered 42 in FIG. 3. The undercutting may be conveniently accomplished with a solution known as CP–4 consisting of hydrofluoric acid and nitric acid. The edges 43 are similarly undercut and an edge portion of the back side of the semiconductor blank which is to be oriented toward the front of the tube is similarly removed as at 44, leaving only area 38 remaining where the arsenic or antimony has diffused out somewhat leaving a copper heavy contact area. This area serves as the target's transparent electrode. A lead may be soldered to the electrode as at 39.

Unfortunately, a tube and extrinsic semiconductor target even constructed in the above manner ordinarily operates successfully for short periods of time only, after which a blurring effect occurs. We attribute this short period of satisfactory operation to the presence of surface currents on the back side of the target or side oriented towards the electron beam. It is further postulated that the surface conduction is in turn caused by a barrier potential near the surface of the semiconductor.

We have discovered that this non-imaging state is prevented or eliminated by providing a target back surface layer near to being the same polarity type as the interior of the semiconductor, as distinguished from the energy band distortion believed to occur in the usual semiconductor which may be characterized as indicating a surface layer quite a bit weaker in polarity than the interior. When the semiconductor is made more nearly the same polarity, the energy bands tend to straighten out or bend the other way, reducing or eliminating the potential barrier. We have additionally discovered that such surface layer may be provided by subjecting the target surface to bombardment with noble gas ions.

The resulting semiconductor surface layer is rendered at least as p-type as the semiconductor interior by this treatment and the surface layer is quite stable despite handling, exposure to oxygen for short periods, rinsing in common solvents such as water, acetone, coating with polystyrene coatings, etc. The treatment is effective in permanently preventing the non-imaging state in targets thus treated. Tubes with such targets have been operated for extended periods of time without ill effects.

The features including the target, target materials, and methods of making and treating the same, including the above procedures, are more fully disclosed and claimed in our application entitled "Photoconductive Camera Tubes and Methods of Manufacture," Serial Number 56,799 filed concurrently herewith and assigned to the assignee of the present invention.

Figures 5, 6, 7:
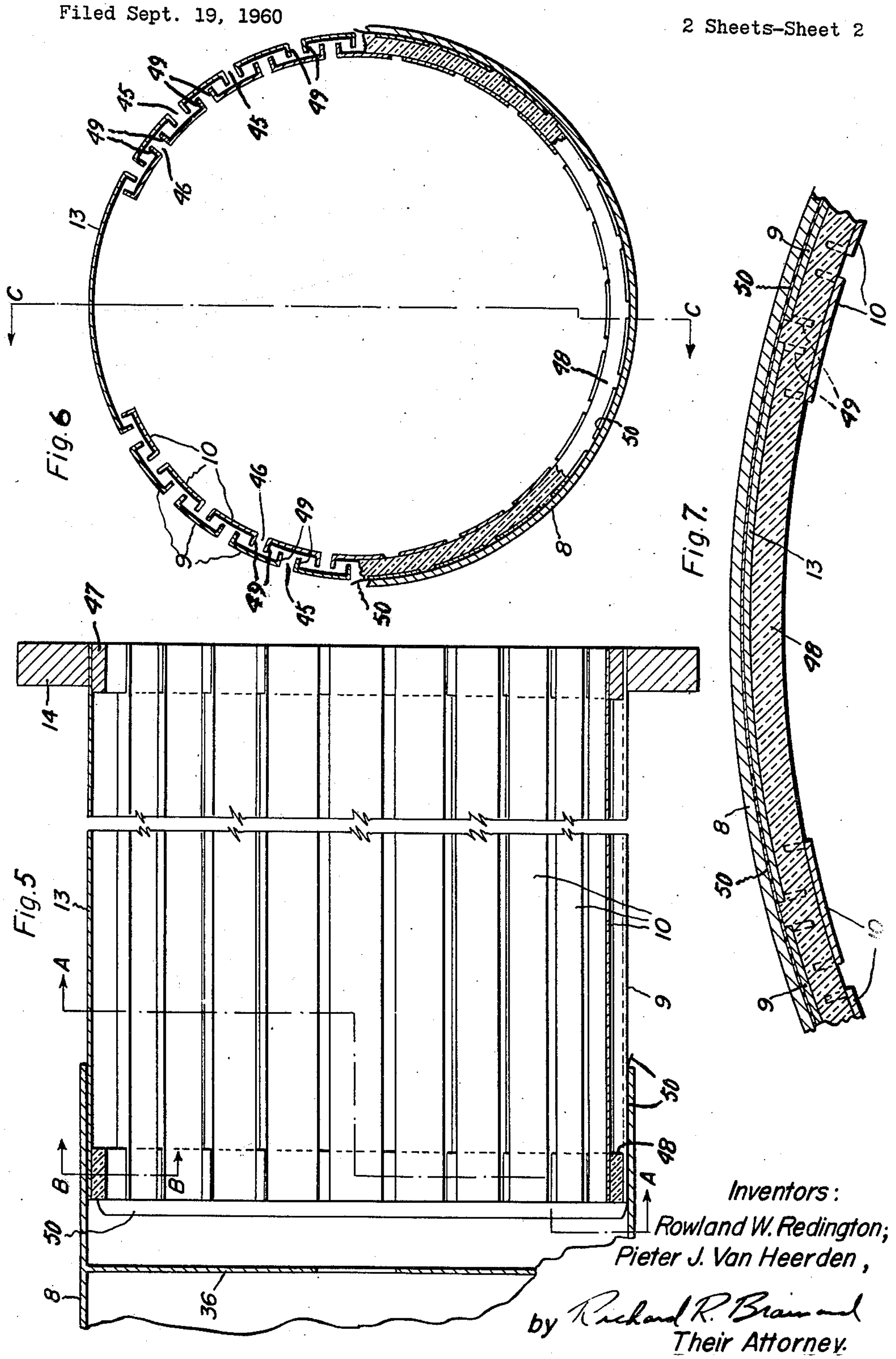
FIG. 5 is an enlarged cross-sectional view of the drift space electrode walls in the FIG. 1 apparatus.
FIG. 6 is a lateral cross section of the aforementioned drift space and walls taken along section A—A in FIG. 5 and showing the interlocking drift space wall construction; and, FIG. 7 is an enlarged cross section taken along section B—B in FIG. 5.

FIGS. 5, 6 and 7 illustrate in some detail the forward cylindrical drift space walls 9 and 10 extending from the drift space wall 8 to the target end of the tube in FIG. 1. This double wall arrangement or bird cage is employed particularly to prevent local generation or passage of infrared radiation which might otherwise reach target 7. Referring to the FIGS. 5, 6 and 7, illustrating, respectively, a longitudinal cross section, a transverse cross section and transverse section detail of the bird cage, an outer drift space wall 9 and an inner drift space wall 10 provided with longitudinal slots 45 and 46, respectively, are supported in their cylindrical configuration by retaining rings 47 and 48. Retaining ring 47 is formed of copper and is disposed between the inside diameter of drift space wall 9 and the outside diameter of drift space wall 10. Drift space wall 9 and drift space wall 10 have tabs or flanges 49 bent toward juxtaposed non-slotted portions of the opposite wall, which tabs define the edges of slots 45 and 46. This interlocked construction provides a circuitous path for infrared radiation outside the drift space walls which might otherwise reach the drift space within the walls. These tabs extend nearly the whole longitudinal length of the drift space walls 9 and 10 but are foreshortened where the walls are separated by retaining rings 47 and 48 so that rings 47 and 48 may abut the wall inside and outside diameters as aforesaid. The walls are soldered to retaining ring 47; at the same end of the bird cage, wall 9 and ring 47 are likewise soldered to flange 14. The resulting joint forms a contiguous heat and electric conduction path to all wall portions at the front or target end of the tube.

The drift space walls are maintained at an electric potential appropriate to aid in focusing the electron beam by means of terminal 15 in FIG. 1. The wall heat is conducted through sapphire spacers 18 and 19 in FIG. 1 for circumferential removal by refrigerated copper annular member 20.

Retaining ring 48 at the opposite end of the bird cage (FIGS. 5, 6 and 7) is similarly disposed to separate outer wall 9 and inner wall 10 which are mechanically secured thereto. As in the case with retaining ring 47, the wall sections have their bent-in tab portions removed where retaining ring 48 fits between the two walls. Retaining ring 48 is formed of aluminum oxide ceramic, metalized with titanium hydride and tinned with pure lead in the immediate area of each wall section between slots, so that the wall sections can be effectively soldered thereto without the wall sections being electrically shorted to one another. Drift space wall 8 extending from the electron gun end of the tube fits over the bird cage but is insulated therefrom except in connecting area 13 by insulation 50, e.g. a sheet of Teflon or mica insulation, fitted between outer wall 9 of the bird cage and drift space wall 8. At connecting area 13, conveniently located at the top of the tube, a soldered connection is made between the outer drift space wall 9 and drift space wall 8 so that drift space wall 8 can be maintained at the same electrical potential as the bird cage. The connecting area 13 may conveniently be formed as a somewhat circumferentially extended section of wall 9, also having bent-in tabs or flanges so as to be otherwise similar to the other wall 9 sections.

The facing surfaces of walls 9 and 10 including the inside surfaces of tabs 49 are blackened to further absorb any infrared radiation which may attempt to pass through slots 45 in the outer wall 9, before such radiation reaches the drift space. A black copper oxide may be conveniently used for coating these inner portions.

This slotted or "bird cage" construction of the forward drift space wall portion of the tube reduces to a minimum the eddy currents which would otherwise be induced in the drift space wall by the deflection coil 31 (FIG. 1) placed therearound. The construction provides for not only the reduction in eddy currents by providing circumferential open circuit to induced currents in the walls, but also shields the inner drift space from outside radiation which otherwise might pass through the wall slots. Furthermore infrared radiation cannot reach the target from the end of the tube opposite the target because of the aforementioned blackened baffles 36 and 37 supported in drift space wall 8 at the opposite end of the tube. The target is therefore substantially shielded from infrared radiation from any direction rearward to the target and therefore the target may exhibit the maximum contrast and sensitivity in the infrared region.

While we have shown and described several embodiments of our invention it will be apparent to those skilled in the art that many other changes and modifications may be made without departing from our invention in its broader aspects and we therefore intend the appended claims to cover all such changes and modifications as fall within the true spirit and scope of our invention.

What we claim as new and desire to secure by Letters Patent of the United States is:

1. In an infrared camera tube including an infrared radiation sensitive target and electron generating means spaced in front of said target for generating a slow beam of electrons scanning said target, drift space walls defining the outer perimeter of a drift space located between said electron generating means and said target, said drift space walls comprising a plurality of interlocked channels extending along said drift space and electrically insulated from one another to forestall the formation of eddy currents in said drift space walls while shielding said drift space and said target from infrared radiation external of said drift space walls.

2. In an infrared camera tube including an infrared radiation sensitive target and electron generating means for providing a beam of electrons scanning said target, a drift space wall substantially circumferentially surrounding said electron beam and in at least a portion of the space between said electron generating means and said target, said drift space wall in part comprising a pair of slotted tubular members, one surrounding the other wherein the slots in the outer tubular member are offset from the slots on the inner tubular member to shield the space inside said tubular members from direct infrared radiation therearound.

3. The apparatus as defined in claim 2 wherein the surfaces of said tubular members between said tubular members are blackened with infrared radiation absorbing material.

4. In an infrared sensitive tube including an infrared sensitive target, the improvement comprising drift space walls near said target including a pair of slotted tubular members substantially axially surrounding the drift space near the target end of said tube, one of said tubular members being larger in outside dimension than the other and having its slots offset with respect to any straight line between the axis of said drift space and passing through the slots of the other tubular member.

5. In an infrared sensitive tube having an infrared sensitive target, the improvement comprising drift space walls near said target including a slotted tubular member substantially axially surrounding the space near the target end of said tube and having a shielding member including means blocking the slots of said slotted tubular member from passing radiation in a radial direction.

6. Drift space walls for an infrared sensitive camera tube which includes an infrared sensitive target at one end thereof, said walls comprising an inner slotted tubular member and an outer slotted tubular member whose slots are offset so as to be juxtaposed with non-slotted portions of said inner tubular member, said members having flanges defining said slots being bent toward the juxtaposed non-slotted portions of the opposite tubular member providing an interlocked configuration and thereby presenting a circuitous path to infrared radiation outside said members.

7. The apparatus as defined in claim 6 having juxtaposed body portions of said tubular members blackened where they face the opposite tubular members and the slots in said opposite tubular member.

8. An infrared camera tube including an infrared radiation sensitive target, an electron beam generating means spaced in front of said target for generating a low energy beam of electrons axial of said tube for scanning said target, drift space walls defining the perimeter of a drift space located between said electron generating means and said target being nearer said target, said walls comprising a conductive inner slotted tubular member and a conductive outer slotted tubular member whose slots are offset so as to be juxtaposed with non-slotted portions of said inner tubular member, each of said walls thereby forming a plurality of conductive elements separated by a plurality of slots, means electrically joining said elements to each other at the target end of said drift space, said elements being insulated from one another at their remote ends and therebetween, and means for coupling a source of voltage to the electrically joined ends of said elements wherein the voltage is substantially equal to the potential of said electron beam in said drift space.

9. In an infrared camera tube including an infrared radiation sensitive target, and electron generating means situated opposite said target for providing a slow beam of electrons scanning said target: a plurality of substantially heat-opaque members provided with apertures, said heat-opaque members being arranged axially along said electron beam near said electron generating means; said apertures being offset with respect to one another in a non-straight line relation with respect to one another, said electron generating means, and said target; electron beam deflection means arranged around said tube in the area of said heat opaque members for deflecting said electron beam through the apertures therein and substantially towards said target; and an electrically conducting drift space wall substantially circumferentially surrounding the space between said target and the heat opaque member nearest said target; said drift space wall comprising an inner slotted tubular member and an outer slotted tubular member both constructed of electrically conducting material and having the slots thereof offset with respect to one another to shield the space inside said drift space wall between said target and the heat opaque member nearest thereto from direct infrared radiation from without said tube.

10. The apparatus as defined in claim 9 wherein the surfaces of said tubular members substantially facing one another are blackened with an infrared radiation absorbing material.

11. The apparatus as recited in claim 9 wherein said slotted members are electrically joined and connected at the target end of said tube, including all the slotted portions thereof, and means for connecting the target end of said tubular members to a source of voltage substantially equal in magnitude to the potential of said electron beam near said target.

12. The apparatus as recited in claim 9 wherein the edges have the tubular members defining the slotted portions are bent towards the other tubular member thereby providing an interlocked configuration presenting a tenuous path for infrared radiation from outside of said tubular members.

13. An infrared camera tube including an infrared radiation sensitive target and electron beam generating means for providing a slow beam of electrons for perpendicular scanning of said target including an electron gun with a heated cathode, a plurality of partial partitions disposed between said electron gun and said target, each being provided with an aperture, said partitions being oriented with said apertures in a non-aligned relation with respect to said electron beam generating means and said target so that direct infrared radiation from said electron beam generating means cannot reach said target, first electromagnetic deflection apparatus for deflecting the said electron beam through one of said apertures and second electromagnetic deflection apparatus for deflecting said electron beam through a second of said apertures.

14. An infrared camera tube including an infrared radiation sensitive target and an electron gun for providing an electron beam for scanning said target, apertured masks spaced along the axial direction of said infrared camera tube comprising a first apertured mask closest to said electron gun with its aperture being centrally located, a second apertured mask disposed closest to said target and also having its aperture centrally located, and a third apertured mask disposed between said first and second masks, said third mask having its aperture laterally displaced from the axis of said infrared camera tube, a first electromagnetic deflection coil means located around said tube between said first and third masks to deflect the said electron beam through the offset aperture in said third mask and a second electromagnetic deflection coil means located around said tube between said second and third masks for redirecting said electron beam through the aperature in said second mask.

References Cited by the Examiner

UNITED STATES PATENTS

| | | | |
|---|---|---|---|
| 1,696,103 | 12/28 | Seibt | 313—348 X |
| 1,721,395 | 7/29 | Hull | 313—348 X |
| 2,365,006 | 12/44 | Ricketts | 313—65 X |

GEORGE N. WESTBY, *Primary Examiner.*

RALPH G. NILSON, *Examiner.*